United States Patent
Yen et al.

(10) Patent No.: US 10,196,100 B2
(45) Date of Patent: Feb. 5, 2019

(54) PICKUP TRUCK CAB EXTENDER SYSTEM AND METHOD

(71) Applicant: GM GLOBAL TECHNOLOGY OPERATIONS LLC, Detroit, MI (US)

(72) Inventors: Chih-Hung Yen, Bloomfield Hills, MI (US); Kuo-Huey Chen, Troy, MI (US); Taeyoung Han, Bloomfield Hills, MI (US); Bahram Khalighi, Birmingham, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/641,766

(22) Filed: Jul. 5, 2017

(65) Prior Publication Data

US 2019/0009840 A1 Jan. 10, 2019

(51) Int. Cl.
*B62D 35/00* (2006.01)
*B62D 33/06* (2006.01)
*B62D 37/02* (2006.01)

(52) U.S. Cl.
CPC .......... *B62D 35/007* (2013.01); *B62D 33/06* (2013.01); *B62D 37/02* (2013.01)

(58) Field of Classification Search
CPC ....... B62D 33/06; B62D 35/007; B62D 37/02
See application file for complete search history.

(56) References Cited

U.S. PATENT DOCUMENTS

| 5,018,779 A * | 5/1991 | Lund | B62D 35/001 296/180.1 |
|---|---|---|---|
| 5,971,469 A * | 10/1999 | Lund | B60J 7/1621 296/100.01 |
| 6,126,229 A * | 10/2000 | Lund | B60J 1/2008 296/180.1 |
| 9,533,720 B1 * | 1/2017 | Luciew | B62D 27/06 |
| 2008/0030049 A1 * | 2/2008 | Cooper | B62D 35/001 296/180.1 |
| 2012/0242833 A1 * | 9/2012 | Yamaguchi | B62D 35/007 348/148 |
| 2015/0266521 A1 * | 9/2015 | Camosy | B62D 27/06 296/180.1 |
| 2016/0236727 A1 * | 8/2016 | Herndon | B62D 35/007 |

* cited by examiner

*Primary Examiner* — Gregory A Blankenship
(74) *Attorney, Agent, or Firm* — Lorenz & Kopf, LLP (57) ABSTRACT

Cab extender systems and methods are provided for reducing the aerodynamic drag on a pickup truck. A cab extender system includes a cab with a roof panel and a rear wall. The cab extends upward on the vehicle to the roof panel and the rear wall extends downward from the roof panel. A tailgate is disposed at a rear of the vehicle and a utility box extends between the rear wall and the tailgate. An extender extends in a rearward direction from the roof panel a length of between ten and twenty centimeters from the rear wall.

7 Claims, 7 Drawing Sheets

PICKUP TRUCK CAB EXTENDER SYSTEM AND METHOD

INTRODUCTION

The present invention generally relates to truck cab extender systems and methods, and more particularly relates to pickup truck cab extenders for aerodynamic drag reduction.

Vehicles of various types may be equipped with spoilers to increase their grip on the road. The spoiler generates a downward force on the vehicle to increase high speed stability but also generates undesirable drag. Drag is the reaction of air to resist motion of the vehicle and creates inefficiencies. Other vehicles may use a spoiler to make the air flowing over the vehicle take a longer, less steep slope off the rear of the vehicle to delay flow separation as long as possible, hick creates higher pressure in front of the spoiler and creates downforce, which also creates undesirable drag. Air flow drag creation is particularly challenging with pickup trucks due to their utilitarian nature where an open box is included at the rear of the vehicle. A known approach to reduce drag for a pickup truck is to completely enclose the box with a cover. However, enclosing the box may limit its utility.

Accordingly, it is desirable to provide improved systems and techniques for influencing the flow of air over a vehicle. In particular, reducing drag for a pickup truck is desirable. It is also desirable to provide methods, systems, and vehicles utilizing such techniques. Furthermore, other desirable features and characteristics of drag reduction will be apparent from the subsequent detailed description and the appended claims, taken in conjunction with the accompanying drawings and the foregoing technical field and introduction.

SUMMARY

Cab extender systems and methods are provided for reducing the aerodynamic drag on a pickup truck. In a number of embodiments, a cab extender system includes a cab with a roof panel and a rear wall. The cab extends upward on the vehicle to the roof panel and the rear wall extends downward from the roof panel. A tailgate is disposed at a rear of the vehicle and a utility box extends between the rear wall and the tailgate. An extender extends in a rearward direction from the roof panel a length of between ten and twenty centimeters from the rear wall.

In another embodiment, the extender is configured to minimize a sum of a first drag force at the rear wall and a second drag force at the tailgate, as compared to the vehicle without the extender.

In another embodiment, the extender is variable between an extended state extending the length from the cab, and a retracted state against the cab.

In another embodiment, the extender includes multiple panels that fold against the cab.

In another embodiment, the extender includes a pair of side segments, each tapered down from its top to its bottom, and a top segment extending along the roof panel, and between the side segments.

In another embodiment, the top segment includes a top surface and the roof panel includes an outer surface, wherein the top surface is aligned with the outer surface in a common plane.

In another embodiment, the length of the extender is no longer than ten centimeters.

In another embodiment, the extender is retractable against the cab so that the box is not obstructed by the extender.

In additional embodiments, a method of controlling pressure distribution around a utility box of a pickup truck that has a cab forward of the utility box, includes generating first pressure distribution data for the vehicle around the utility box. A first drag force on the vehicle is calculated using the first pressure distribution data. An extender that extends from the cab a length is selected. Second pressure distribution data is generated around the utility box for the vehicle with the extender. A second drag force on the vehicle with the extender is calculated using the second pressure distribution data. The second drag force is compared to the first drag force. When the second drag force is less than the first drag force, the vehicle is assembled with the extender that has the length.

In another embodiment, the method includes selecting the extender with the length of between ten and twenty centimeters.

In another embodiment, the method includes selecting a different length for the extender when the second drag force is not less than the first drag force.

In another embodiment, the method includes directing a pressure distribution around the utility box by the extender, resulting in a decrease in air pressure inside the box at the tailgate as compared to the vehicle without the extender.

In another embodiment, the method includes directing a pressure distribution around the utility box by the extender, resulting in a decrease in pressure outside the cab at the rear wall as compared to the vehicle without the extender.

In another embodiment, the method includes selecting the extender with the length of no more than ten centimeters.

In another embodiment, the method includes reducing, by the extender, a drag coefficient of the vehicle by more than seven percent as compared to the vehicle without the extender.

In another embodiment, the method includes constructing the extender to retract against the cab.

In another embodiment, the method includes providing the retractor with hinges so the retractor is foldable against the cab.

In another embodiment, the method includes constructing the extender with a top panel that includes a top surface. The roof panel includes an outer surface and the top surface is aligned with the outer surface in a common plane.

In another embodiment, the method includes generating, by the extender, a pressure distribution behind the cab so that a first drag force on the rear wall is greater than a second drag force on the rear wall for the vehicle without the extender.

Additional embodiments include a vehicle with a cab that has a rear wall that is substantially vertical, and a roof panel that is substantially horizontal. The rear wall and the roof panel meet at a rear edge of the cab. A utility box is disposed rearward of the cab, and the cab generally extends upward from the utility box. The utility box extends from the cab to a rear end of the vehicle. A tailgate closes the box at the rear end. An extender extends from the rear edge a length of at least ten centimeters and at most, twenty centimeters. The extender is configured to generate a pressure distribution in the box that minimizes a drag force on the vehicle at the tailgate. The extender is also configured to generate the pressure distribution in the box to minimize a pressure decrease outside the cab at the rear wall as compared to the vehicle without the extender. The extender is also configured to reduce a drag coefficient of the vehicle as compared to the vehicle without the extender.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to impart limitations on the disclosure. Furthermore, there is no intention to be bound by any theory presented in the preceding sections, or the following detailed description. In a number of examples as described herein, aerodynamic drag is reduced without sacrificing cargo space/utility of a pickup truck. Drag reduction is achieved through extenders that may be a part of a pick-up truck cab body structure, or that may be connected therewith. An extender may be retractable, may be deployed on demand manually or automatically with a variable length, or may be fixed.

The air pressure distribution within and around the open utility box of a pickup truck is a significant factor in determining the drag on the pickup truck. It has been found that too high of a pressure in the box, particularly at the inside of the tailgate contributes to higher drag. It has also been found that too low of a pressure in the box, particularly at a rear wall, which may include the front wall of the box and cab back wall, contributes to an increase in drag. Short of completely covering the entire box, drag reduction is maximized as described herein by optimizing the balance between reduced pressure inside the tailgate, and pressure level inside the box at the rear wall. Unexpectedly, a short extender has been found to provide the best balance when compared to a longer extender.

Figure 1:
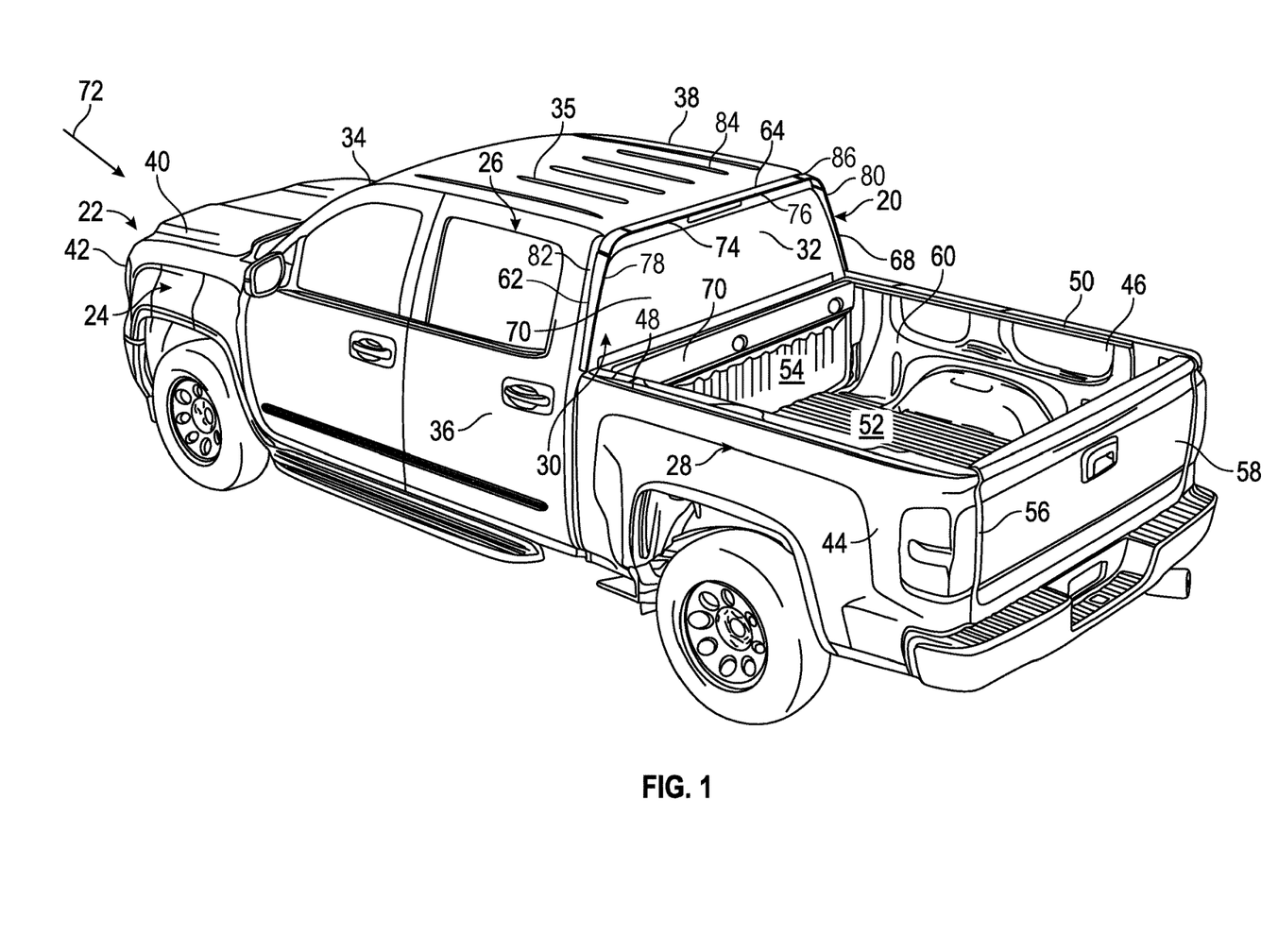
FIG. 1 is an illustration of a pickup truck with a cab extender, in accordance with an exemplary embodiment.

In a number of examples, an extender system 20 may be employed for a vehicle 22, such as indicated in FIG. 1. The vehicle 22 may be any one of a number of different types of vehicles, and for purposes of the present example, is a pickup truck of any configuration. As depicted in FIG. 1, the vehicle 22 may include a body 24 that has a cab 26 and a utility box 28 rearward of the cab 26. The cab 26 is generally disposed in front of the utility box 28 and extends upward from the utility box 28. The cab 26 has a back wall 30 that is substantially vertical and which may include a rear window 32. The front of the cab 26 is formed in-part by a windshield 34 that slopes rearward from its bottom to its top. The top of the cab 26 is formed by a roof panel 35 that is generally horizontally disposed and that from front to back, extends between the windshield 34 and the back wall 30. From side-to-side, the roof panel 35 extends between the sides 36 and 38. The sides 36, 38 of the cab 26 are generally defined by door frames/pillars, and doors which may contain side windows. Forward of the cab 26, the vehicle 22 includes an engine compartment covered by a hood 40 and extending to a front grill 42. The utility box 28 includes side panels 44 and 46 that have top edges at rails 48 and 50 respectively. The utility box 28 has a floor referred to as a bed 52, and a front wall 54 adjacent the back wall 30 and extending upward from the bed 52 to the height of the rails 48, 50. The utility box 28 has a rear opening 56 closed by a tailgate 58. The tailgate 58 also extends upward from the bed 52 to the height of the rails 48, 50. As a result, the utility box 28 is formed in the shape of a box with five closed sides and an open top 60.

At least some of the air displaced by the front of the vehicle 22 when travelling forward flows along the sides 36, 38, over the top of the cab 26 along the roof panel 35, and under the vehicle 22. When the air flowing over the top and sides of the cab 26 reaches the rear edges 62, 64, 68, it separates from the vehicle 22. At the rear edge 64 of the roof panel 35 the back wall 30 extends downward at a steep angle, such as approximately ninety degrees. The air flowing over and around the cab 26 moves above or into the utility box 28, and creates pressure, such as around the tailgate 58, the front wall 54 of the utility box 28, and the back wall 30 of the cab 26 creating drag on the vehicle 22. For purposes of pressure and drag at the back wall 30 of the cab 26 and the front wall 54 of the utility box 28, the two are referred to together herein as the rear wall 70 of the cab 26.

Figure 2:
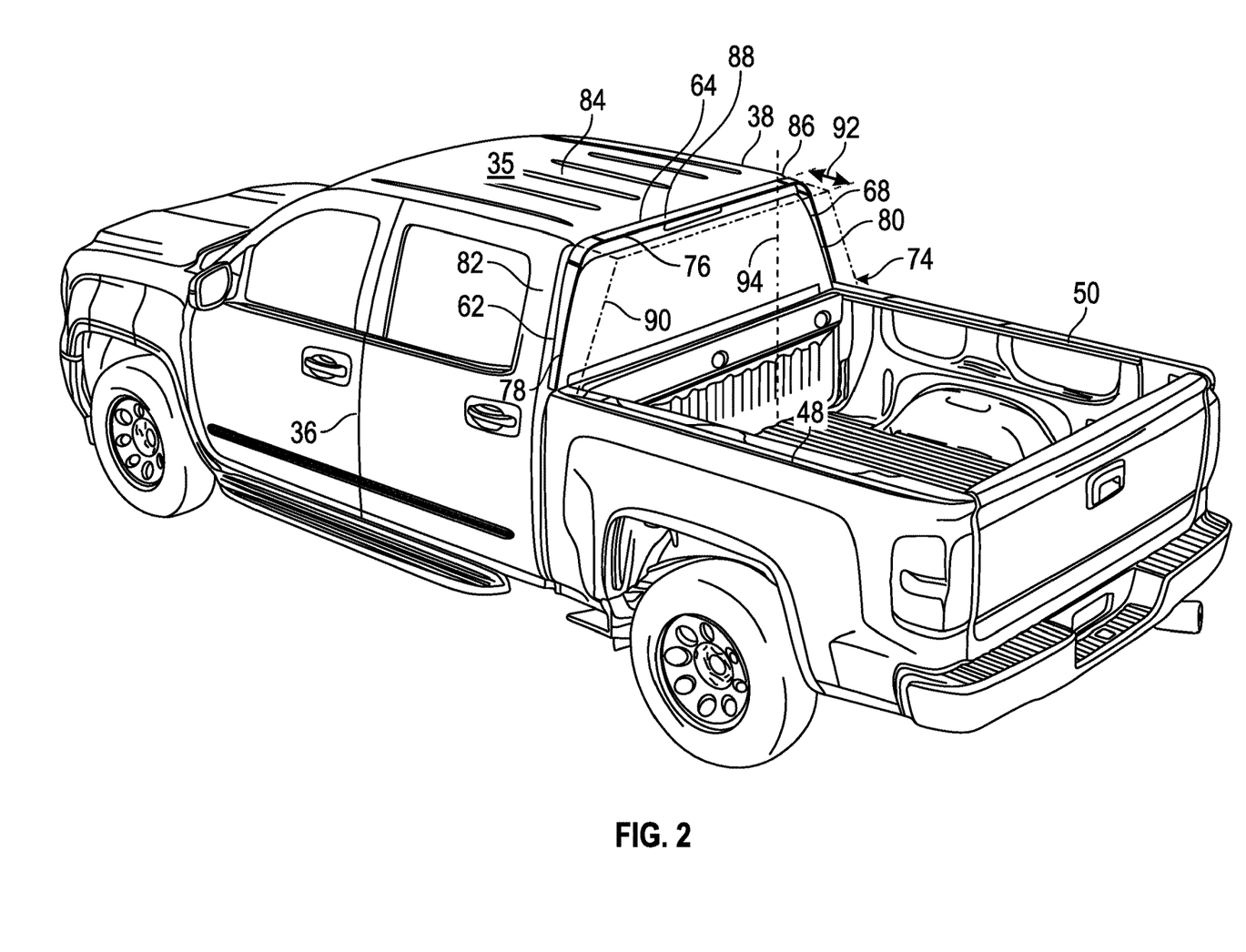
FIG. 2 is an illustration of a pickup truck with a cab extender, in accordance with various embodiments.

Air flow in a rearward direction 72 from the cab 26 and the resulting pressures may be influenced by including an extender 74 at the rear edges 62, 64 and 68. With additional reference to FIG. 2, the extender 74 includes three segments, including a top segment 76 along the rear edge 64 of the roof panel 35. The extender 74 includes two side segments 78 and 80 along the rear edges 62, and 68 respectively. Each of the three segments 76, 78, 80 matches the profile of its corresponding cab panel along its respective rear edge 62, 64, 68. The top segment 76 matches the profile of the roof panel 35 along its rear edge 64 so that the top segment 76 joins with the roof panel 35 evenly and without gaps. The side segments 78 and 80 match the profile of their respective side 36, 38 along their rear edges 62, 68 so that the side segments 78, 80 join with the sides 36, 38 evenly and without gaps. The segments 76, 78, 80 are each flush with the outer surfaces 82, 84, 86 respectively of the side 36, roof panel 35 and side 38. The extender 74 is integrated with the cab 26 without gaps to prevent air entrainment between the two. The extender 74 may have a fixed length such as shown in FIG. 1 or may have a variable length such as shown in FIG. 2. Each of the side segments 78, 80 tapers downward from its top at the roof panel 35 to its bottom at the rail 48, 50 including when in the retracted state 88 shown in FIG. 2. When in the extended state 90, as shown in FIG. 2, the extender 74 extends from the rear edges 62, 64, 68 a length (L), 92, which is greater than its length in the retracted state 88. The extender 74 may be constructed from a number of, or a combination of, materials including plastics, metals, lightweight composites, or others.

Figure 3:
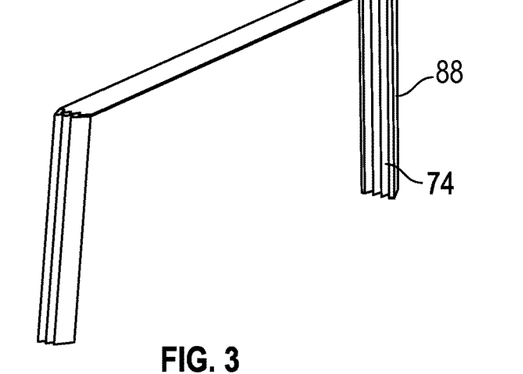
FIG. 3 is a perspective illustration of a cab extender, in accordance with various embodiments.

With additional reference to FIG. 3, the extender 74 may have a variable length repositionable between the retracted state 88, the extended state 90 shown in FIG. 2, and any number of intermediate positions between the retracted state 88 and the extended state 90. The retracted state 88 places the extender 74 close to the cab 26 to maximize the usable cargo space of the utility box 28. The entire extender 74 is positioned closer to the back wall 30 than the plane of the front wall 54 of the utility box 28 so that the extender 74 does not interfere with an object 94 positioned against the front wall 54 and extending upward along the cab 26 as depicted in FIG. 2. The extender 74 is extendable to the extended state 90 with a length of, for examples, ten centimeters, or in other examples to variable positions. This extension length 92 is further explained below. The extender 74 may include multiple folds as shown in FIG. 3 to retract to a compact retracted state 88, and presents a smooth surface when in the extended state 90 as shown in FIG. 2.

Figure 4:
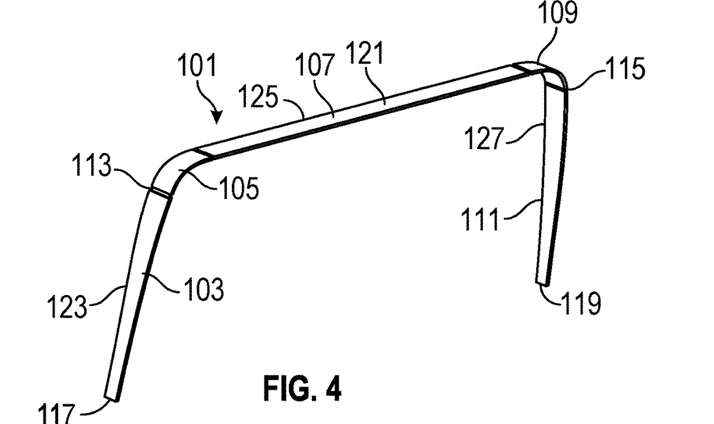
FIG. 4 is a perspective illustration of a cab extender, in accordance with various embodiments.
Figure 5:
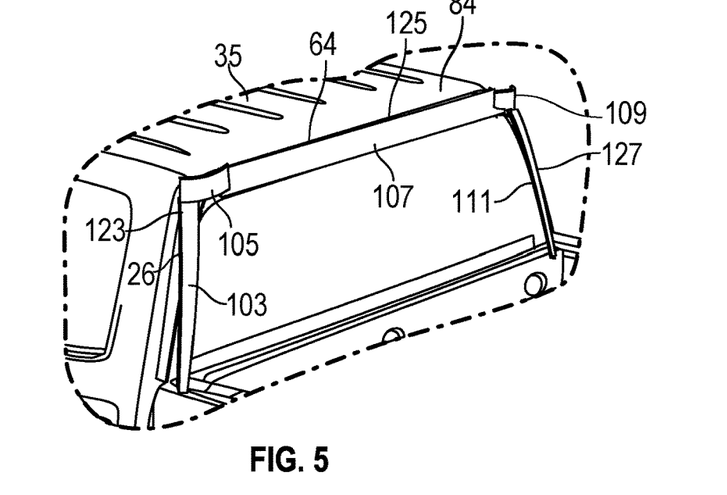
FIG. 5 is a perspective illustration of a cab extender, in accordance with various embodiments.

With reference to FIGS. 4 and 5, an extender 101 may include multiple segments 103, 105, 107, 109 and 111 that retract by folding against the cab 26 as shown schematically in FIG. 5. The side segments 103, 111 are tapered from their tops 113, 115 to their bottoms 117, 119 and extend from the rails 48, 50 to corner segments 105, 109. A top segment 107 extends between the corner segments 105, 109 along the rear edge 64 of the roof panel 35. The top segment 107 includes a top surface 121 that is aligned with the outer surface 84 of the roof panel 35 and is in a common plane therewith, to maintain smooth airflow over the two. The side segments 103, 111 and the top segment 107 may be connected to the cab 26 with hinges 123, 125, 127 and the corner segments 105, 109 may be similarly connected to the cab 26 or may be connected to the side and top segments 103, 111, 107 such as with linkages (not shown), that articulate the corner segments 105, 109 between the extended state of MG. 4 and the retracted state of FIG. 5 when the side 103, 111 and top segments 107 are repositioned. The extender 101 may be manually moved between the retracted state of FIG. 5 and extended state of PG, 4, or may be automatically driven by actuators (not shown).

Figure 6:
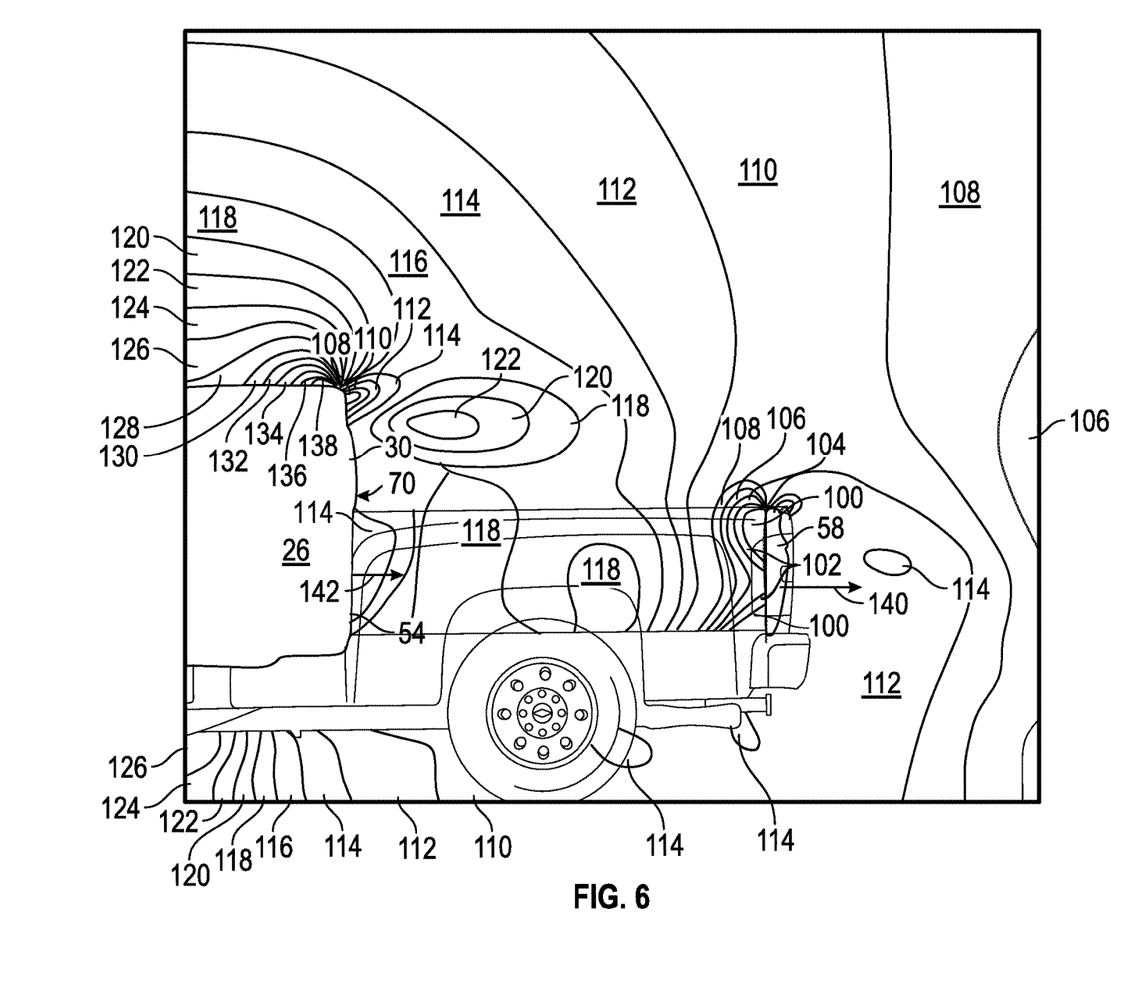
FIG. 6 is an illustration of pressure distribution around the cab and box of a pickup truck, without a cab extender for comparison purposes.

FIG. 6 shows the pressure distribution around the vehicle 22 with an open utility box 28 and without an extender. The image is created using computational fluid dynamics (CFD) simulation for pressure visualization and force calculations. The pressure distribution includes pressure areas 100 at pressures between 34.2 and 50.0 Pascal. This pressure results around and at the inside of the tailgate 58. A pressure area 102 at pressures between 18.4 and 34.2 Pascal results adjacent the pressure area 100 around and at the inside of the tailgate 58. Pressure area 104 at pressures between 2.6 and 18.4 Pascal results adjacent the pressure area 102 around and at the inside of the tailgate 58. Pressure areas 106 at pressures between −13.2 and 2.6 Pascal result adjacent the pressure area 104 around the inside of the tailgate 58 and also spaced away from the rear of the vehicle 22. Pressure areas 108 at pressures between −28.9 and −13.2 Pascal result adjacent the pressure area 106 around the inside of the tailgate 58, spaced away from the rear of the vehicle, and behind the cab 26 near the top of the rear wall 70. Pressure areas 110 at pressures between −44.7 and −28.9 Pascal result inside and above the utility box 28, above and behind the tailgate 58, under the vehicle 22, and behind the cab 26 near the top of the rear wall 70. Pressure areas 112 at pressures between −60.5 and −44.7 Pascal result inside and above the utility box 28, behind the tailgate 58, under the rear of the vehicle 22, and behind the cab 26 near the top of the rear wall 70. Pressure areas 114 at pressures between −76.3 and −60.5 Pascal result inside and above the utility box 28, behind the vehicle 22, under the vehicle 14 and behind the cab 26 near the top of the rear wall 70. Pressure areas 116 at pressures between −92.1 and −76.3 Pascal result inside and above the utility box 28, behind the cab 26, above the cab 26, and under the vehicle 22. Pressure areas 118 at pressures between −107.9 and −92.1 Pascal result above the cab 26, under the vehicle 22, and inside and above the utility box 28. Pressure areas 120 at pressures between −123.7 and −107.9 Pascal result above the cab 26, and under the vehicle 22. Pressure areas 122 at pressures between −139.5 and −123.7 Pascal result above the cab 26, and under the vehicle 22. Pressure areas 124 at pressures between −155.3 and −139.5 Pascal result above the cab 26, and under the vehicle 22. Pressure areas 126 at pressures between −171.1 and −155.3 Pascal result above the cab 26 and under the vehicle 22. Pressure area 128 at pressures between −186.8 and −171.1 Pascal results above the cab 26 at/near the roof panel 35 near its rear edge 64. Pressure area 130 at pressures between −202.6 and −186.8 Pascal results above the cab 26 at/near the roof panel 35. Pressure area 132 at pressures between −218.4 and −202.6 Pascal results above the cab 26 and at the roof panel 35. Pressure area 134 at pressures between −234.2 and −218.4 results above the cab 26 and at the roof panel 35. Pressure area 136 at pressures between −250.0 and −234.2 results above the cab 26 and at the roof panel 35. From the pressure distribution of FIG. 6, it is shown that relatively high pressure in the range of 2.6 to 50.0 Pascal, results inside the tailgate 58 and a relatively low pressure between −92.1 and −60.5 Pascal results at the front wall 54 inside the utility box 28. Low pressure behind the cab 26 and at the inside of the front wall 54 of the utility box 28 on its rearward surface creates a tendency to pull the vehicle 22 rearward. High pressure at the inside of the tailgate 58 at its forward surface has a tendency to push the vehicle 22 rearward. The net result is a force 140 of 20.1 Newtons directed rearward at the tailgate 58 and a force 142 of 152.6 Newtons directed rearward at the rear wall 70, including the front wall 54, for a sum of 172.8 Newton rearward force as drag on the vehicle 22 from these two drag components, factoring in rounding. The resulting forces were calculated using commercially available CFD software.

Figure 7:
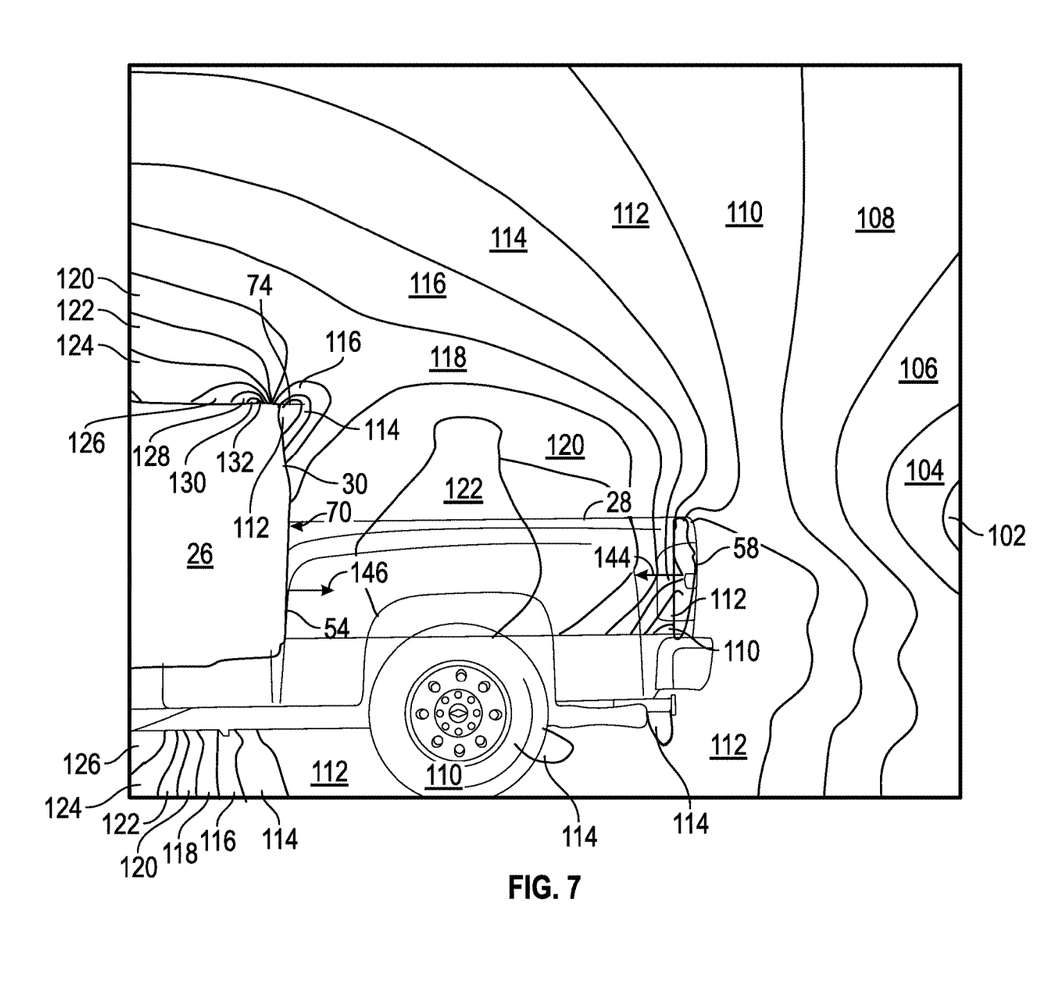
FIG. 7 is an illustration of pressure distribution around the cab and box of the pickup truck of FIG. 6 with a cab extender, in accordance with various embodiments.

FIG. 7 shows the pressure distribution around the vehicle 22 with an open utility box 28 and with an extender 74 with a length L of ten centimeters. The image is created by CFD simulation for pressure visualization and force calculations. The pressure distribution includes pressure area 102 at pressures between 18.4 and 34.2 Pascal that results behind and spaced away from the vehicle 22. Pressure area 104 at pressures between 2.6 and 18.4 Pascal results adjacent the pressure area 102 and is also spaced away from the rear of the vehicle 22. Pressure area 106 at pressures between −13.2 and 2.6 Pascal results adjacent the pressure area 104 and spaced away from the rear of the vehicle 22. Pressure area 108 at pressures between −28.9 and −13.2 Pascal results adjacent the pressure area 106 and spaced away from the rear of the vehicle 22. Pressure areas 110 at pressures between −44.7 and −28.9 Pascal result at the lower inside of the tailgate 58, behind and at the outside of the tailgate 58, and under the vehicle 22. Pressure areas 112 at pressures between −60.5 and −44.7 result at the lower inside of the tailgate 58, behind the cab 26 near the top of the rear wall 70, above the utility box 28, behind the tailgate 58, and under the vehicle 22. Pressure areas 114 at pressures between −76.3 and −60.5 Pascal result behind the cab 26 near the top of the rear wall 70, inside and above the utility box 28 and under the vehicle 22. Pressure areas 116 at pressures between −92.1 and −76.3 Pascal result inside and above the utility box 28, behind the cab 26 near the top of the rear wall 70, and under the vehicle 22. Pressure areas 118 at pressures between −107.9 and −92.1 Pascal result inside and above the utility box 28, behind the cab 26, above the cab 26, and under the vehicle 22. Pressure areas 120 at pressures between −123.7 and −107.9 Pascal result inside and above and inside the utility box 28, behind the cab 26, above the cab 26, and under the vehicle 22. Pressure areas 122 at pressures between −139.5 and −123.7 Pascal result inside and above the utility box 28, above the cab 26 and under the vehicle 22. Pressure areas 124 at pressures between −155.3 and −139.5 Pascal result above the cab 26 at the roof panel 35, and under the vehicle 22. Pressure areas 126 at pressures between −171.1 and −155.3 Pascal result above the cab 26 at the roof panel 35, and under the vehicle 22. Pressure area 128 at pressures between −186.8 and −171.1 Pascal results above the cab 26 at/near the roof panel 35. Pressure area 130 at pressures between −202.6 and −186.8 Pascal results above the cab 26 at/near the roof panel 35. Pressure area 132 at pressures between −218.4 and −202.6 Pascal results above the cab 26 at/near the roof panel 35. From the pressure distribution of FIG. 7, it is shown that relatively low pressure 110, 112, 114 between −76.3 and −28.9 Pascal, results inside the tailgate 58 and a relatively low pressure 120 between −123.7 and −107.9 Pascal results at the utility box 28 front wall 54. The resulting force 144 is a 41.2 Newton forward force at the tailgate 58 and a 193.1 Newton rearward force 146 at the rear wall 70 for a sum of 152.0 Newton rearward force factoring in rounding.

Figure 8:
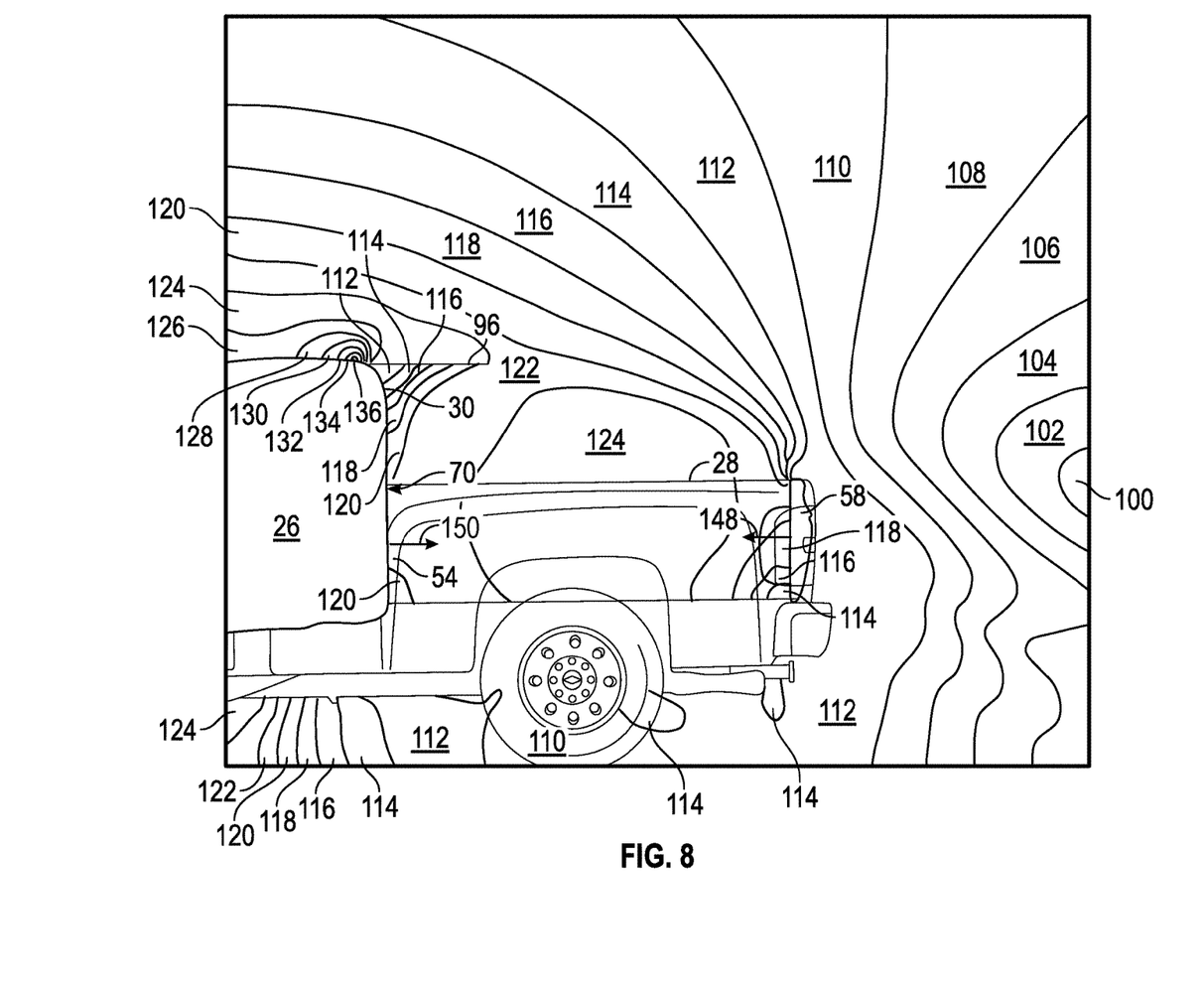
FIG. 8 is an illustration of pressure distribution around the cab and box of the pickup truck of FIG. 6 with an example cab extender for comparison.

FIG. 8 shows the pressure distribution around the vehicle 22 with an open utility box 28 and with an extender 96 with a length L of fifty-two centimeters. The image is created by CFD simulation for pressure visualization and force calculations. The pressure distribution includes pressure areas 100 at pressures between 34.2 and 50.0 Pascal. This pressure results in an area behind and spaced away from the back of the vehicle 22. Pressure area 102 at pressures between 18.4 and 34.2 Pascal results behind and spaced away from the vehicle 22 adjacent the pressure area 100. Pressure area 104 at pressures between 2.6 and 18.4 Pascal results adjacent the pressure area 102 and is also spaced away from the rear of the vehicle 22. Pressure area 106 at pressures between −13.2 and 2.6 Pascal results adjacent the pressure area 104 and spaced away from the rear of the vehicle 22. Pressure area 108 at pressures between −28.9 and −13.2 Pascal results adjacent the pressure area 106 and spaced away from the rear of the vehicle 22. Pressure areas 110 at pressures between −44.7 and −28.9 Pascal result behind the vehicle 22, and under the vehicle 22. Pressure areas 112 at pressures between −60.5 and −44.7 Pascal result above and behind the utility box 28, behind the cab 26 under the extender 96, behind and at the outside of the tailgate 58, and under the vehicle 22. Pressure areas 114 at pressures between −76.3 and −60.5 Pascal result above the utility box 28, behind the cab 26, inside the utility box 28 at the bottom of the inside of the tailgate 58, under the extender 96, and under the vehicle 22. Pressure areas 116 at pressures between −92.1 and −76.3 Pascal result above the utility box 28, above the cab 26, under the extender 96, inside the tailgate 58, and under the vehicle 22. Pressure areas 118 at pressures between −107.9 and −92.1 Pascal result inside and above the utility box 28, under the extender 96, above the cab 26, inside the tailgate and under the vehicle 22. Pressure areas 120 at pressures between −123.7 and −107.9 Pascal result at the bottom of the rear wall 70, under the extender 96, above the vehicle 22, and under the vehicle 22. Pressure areas 122 at pressures between −139.5 and −123.7 Pascal result inside and above the utility box 28, above the cab 26, at the rear wall 70, and under the vehicle 22. Pressure areas 124 at pressures between −155.3 and −139.5 Pascal result inside and above the utility box 28, above the cab 26, and under the vehicle 22. Pressure area 126 at pressures between −171.1 and −155.3 Pascal results above the cab 26 and at the roof panel 35. Pressure area 128 at pressures between −186.8 and −171.1 Pascal results above the cab 26 at/near the roof panel 35. Pressure area 130 at pressures between −202.6 and −186.8 Pascal results above the cab 26 at/near the roof panel 35. Pressure area 132 at pressures between −218.4 and −202.6 Pascal results above the cab 26 and at the roof panel 35. Pressure area 134 at pressures between −234.2 and −218.4 results above the cab 26 and at the roof panel 35. Pressure area 136 at pressures between −250.0 and −234.2 results above the cab 26 and at the roof panel 35. From the pressure distribution of FIG. 8, it is shown that relatively low pressure 114, 116, 118 between −107.9 and −60.5 Pascal, results inside the tailgate 58 and a relatively low pressure 120, 122 between −139.5 and −107.9 results at the front wall 54 inside the utility box 28. The resulting force 148 is a 65.9 Newton forward force at the tailgate 58 and a 226.9 Newton rearward force 150 at the rear wall 70 for a sum of 161.0 Newtons rearward force.

From the force distributions of FIGS. 6-8 for the same vehicle-to-air speed, it is shown that the vehicle 22 with an open utility box 28 and no extender results in a rearward drag force of 172.8 Newtons. The vehicle 22 with an open utility box 28 and an extender 74 of ten-centimeters length L results in a rearward drag force of 152.0 Newtons. The vehicle 22 with an open utility box 28 and an extender 96 of fifty-two centimeters length L results in a rearward drag force of 161.0 Newtons. Accordingly, a short extender 74 of ten centimeters provides a larger drag reduction than a longer extender 96 of fifty-two centimeters and both extenders 74, 96 reduce drag as compared to the vehicle 22 with no extender.

Table 1 provides a summary of the drag coefficient ($C_d$) for various examples of the vehicle 22 with no extender, different length extenders, or a full box cover. $C_d$ is calculated using the following equation:

$$C_d = \left(\frac{2F_d}{\rho \mu^2 A}\right)$$

where:

$F_d$ is the drag force on the vehicle 22;

$\rho$ is the mass density of air;

$\mu$ is the flow speed of the vehicle 22 relative to the air;

A is the frontal area of the vehicle 22.

As is readily apparent from Table 1, a full utility box cover provides the lowest $C_d$ and the open utility box 28 with no extender provides the highest $C_d$. Surprisingly, of the various extenders with lengths of ten, twenty, twenty-six, fifty-two and one-hundred-five centimeters, the shortest extender of ten centimeters provides the lowest $C_d$ for the vehicle 22 with an extender. This is due to the resulting pressure distribution as shown in FIG. 7 and as described above, and its effect on the vehicle 22. The shortest extender 74 has the added benefits of having the least interference with the use of the cargo area of the utility box 28 and has the lowest weight.

TABLE 1

| Extender Length | Drag Coefficient $C_d$ | Reduction from Baseline |
|---|---|---|
| No Extender (Baseline) | 0.335 | — |
| 10 cm | 0.310 | 0.025 |
| 20 cm | 0.311 | 0.024 |
| 26 cm | 0.312 | 0.023 |
| 52 cm | 0.313 | 0.022 |
| 105 cm | 0.311 | 0.024 |
| Full Box Cover | 0.306 | 0.029 |

Figure 9:
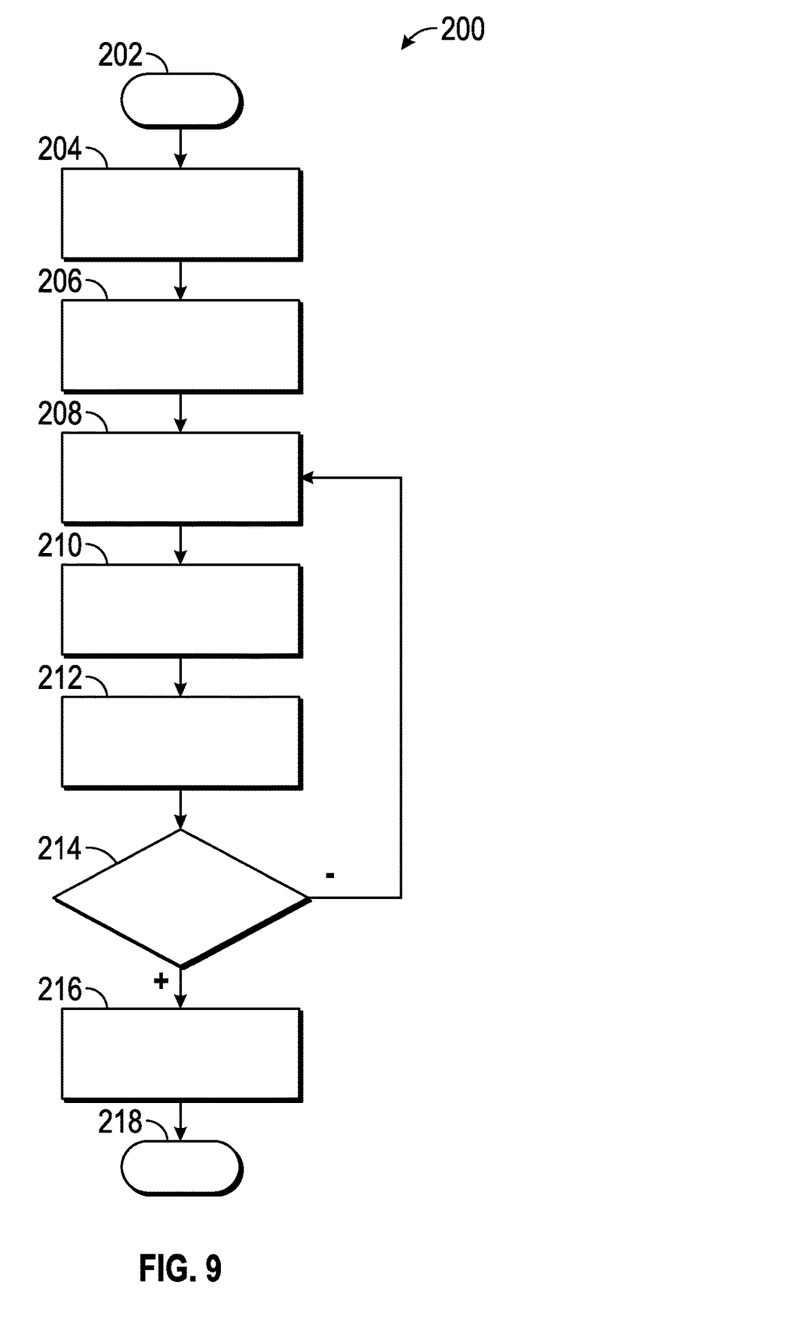
FIG. 9 is a flow chart of methods for optimizing a pickup truck cab extender, in accordance with various embodiments.

Table 1 demonstrates that for the vehicle 22, an extender of ten centimeters length is preferable and provides a $C_d$ improvement of 7.5 percent as compared to the baseline vehicle 22 with no extender of cover. With reference to FIG. 9, a process 200 for determining a pickup cab extender that provides optimal drag reduction may be initiated at step 202 when selecting an extender for use with a vehicle such as the vehicle 22, and may be carried out through the methods described herein. FIG. 9 is a flowchart of the process 200 carried out in accordance with an exemplary embodiment. From step 202 the process 200 proceeds to step 204 where the pressure distribution about the utility box 28 is generated using CFD simulation such as with commercially available software. The drag force on the tailgate 58 ($F_{t1}$) and on the rear wall 70 ($F_{cr1}$) are calculated using CFD simulation. The combined drag force of these two components on the vehicle 22 without an extender ($F_1$) is calculated by adding $F_{t1}$ and $F_{cr1}$. The process 200 proceeds to step 206 where a length L for the extender is selected based on styling design preferences and utility box 28 use preferences. Any length L may be selected, but based on the above description, the length may more efficiently be selected from between ten and twenty centimeters ($10 \leq L \leq 20$). With the selected L, the process 200 proceeds to step 210 where the pressure distribution about the utility box 28 for the vehicle 22 with an extender of selected length L is generated using CFD simulation. The drag force $F_{t2}$ at the tailgate 58 and the drag force $F_{cr2}$ at the rear wall 70 are calculated using CFD simulation. The combined drag force $F_2$ for these two components on the vehicle 22 with an extender of selected length L is calculated by adding $F_{t2}$ and $F_{cr2}$. The process 200 proceeds to step 214 where $F_2$ is compared to $F_1$. A determination is then made as to whether the L selected at step 208 resulted in an acceptable drag force. In a number of examples at step 208, if the L was selected from between ten and twenty centimeters, the determination may simply be to determine whether $F_2 < F_1$. Where the determination is negative and $F_2$ is greater than $F_1$, the process 200 returns to step 208 and another length for the extender between ten and twenty centimeters is selected. The process 200 cycles through steps 208 through 214. When a positive determination results at step 214 the process 200 proceeds to step 216 where the length L from step 208 is used to fabricate an extender 74 and construct the vehicle 22 with the extender 74, and the process ends at step 218. In other examples at step 208, where L is selected without being limited to between ten and twenty centimeters, the steps 208-214 may be processed iteratively in a loop to create a number of drag force results for a number of selected extender lengths L. The selected extender length L that results in the lowest drag force is then selected for use at step 214. More specifically, the generated drag force results from step 212 are compared, and the length L corresponding to the lowest drag force is selected. With the selected L the process 200 proceeds to step 216 where the length L from step 208 is used to fabricate an extender and to construct the vehicle 22 with the extender, and the process ends at step 218. By adding the $F_t$ and $F_{cr}$ components the process 200 optimizes the balance between reduced pressure inside the tailgate 58 and the pressure level at the rear wall 70, and enables selecting the length L corresponding to the lowest combined drag force for these two drag components on the vehicle 22.

Through the foregoing examples, aerodynamic drag is reduced without sacrificing cargo space/utility of a pickup truck. While examples have been presented in the foregoing detailed description, it should be appreciated that a vast number of variations exist. It should also be appreciated that details are only examples, and are not intended to limit the disclosure's scope, applicability, or configurations, in any way. Rather, the foregoing detailed description will provide those skilled in the art with a convenient road map for implementing examples of the invention. It being understood that various changes may be made in the function and arrangement of elements described in examples without departing from the scope as set forth in the appended claims.

What is claimed is:

1. A cab extender system for a vehicle comprising:
   a cab with a roof panel and a rear wall, the cab extending upward on the vehicle to the roof panel and the rear wall extending downward from the roof panel;
   a tailgate disposed at a rear of the vehicle;
   a utility box extending between the rear wall and the tailgate; and
   an extender extending in a rearward direction from the roof panel a length of between ten and twenty centimeters from the rear wall;
   wherein the extender is variable between an extended state extending the length from the cab, and a retracted state against the cab;
   wherein the extender includes a pair of side segments extending from a top to a bottom, each side segment tapered down from the top to the bottom and a top segment extending along the roof panel and between the side segments.

2. The cab extender system of claim 1 wherein the extender is configured to minimize a sum of a first drag force at the rear wall and a second drag force at the tailgate as compared to the vehicle without the extender.

3. The cab extender system of claim 1 wherein the extender includes multiple panels that fold against the cab.

4. The cab extender system of claim 1 wherein the top segment includes a top surface and the roof panel includes an outer surface, wherein the top surface is aligned with the outer surface in a common plane.

5. The cab extender system of claim 1 wherein the length is no longer than ten centimeters.

6. The cab extender system of claim 5 wherein the extender is retractable against the cab so that the utility box is not obstructed by the extender.

7. A vehicle comprising:
   a cab that has a rear wall that is substantially vertical and a roof panel that is substantially horizontal, the rear wall and the roof panel meeting at a rear edge of the cab;
   a utility box rearward of the cab, wherein the cab generally extends upward from the utility box and the utility box extends from the cab to a rear end;
   a tailgate closing the utility box at the rear end; and
   an extender extending from the rear edge a length of at least ten centimeters and at most twenty centimeters, wherein the extender includes a pair of side segments extending from a top to a bottom, each side segment tapered down from the top to the bottom and a top segment extending along the roof pan& and between the side segments;

wherein the extender is configured to:
    generate a pressure distribution in the utility box that minimizes a drag force on the vehicle at the tailgate;
    generate the pressure distribution in the utility box to minimize a pressure decrease outside the cab at the rear wall as compared to the vehicle without the extender;
    reduce a drag coefficient of the vehicle as compared to the vehicle without the extender.

* * * * *